(12) United States Patent  
Sakata (10) Patent No.: US 7,649,733 B2
(45) Date of Patent: Jan. 19, 2010

(54) IMAGE DISPLAY DEVICE (75) Inventor: Tatsuya Sakata, Tokyo (JP)

(73) Assignee: Sony Corporation (JP)

( * ) Notice: Subject to any disclaimer, the term of this patent is extended or adjusted under 35 U.S.C. 154(b) by 10 days.

(21) Appl. No.: 11/999,862

(22) Filed: Dec. 7, 2007

(65) Prior Publication Data

US 2008/0158803 A1 Jul. 3, 2008

(30) Foreign Application Priority Data

Dec. 27, 2006 (JP) ............................ P2006-352609

(51) Int. Cl.
*G06F 1/16* (2006.01)

(52) U.S. Cl. .................. 361/679.06; 312/326; 345/467; 701/209; 349/137

(58) Field of Classification Search ............... 312/223.1, 312/326; 345/418, 467; 370/256, 400, 408; 463/20, 27, 31; 701/208, 209; 455/575.1; 349/123, 139, 137; 361/679.06, 679.21, 361/679.27, 679.29

See application file for complete search history.

(56) References Cited

U.S. PATENT DOCUMENTS 7,016,186 B2 * 3/2006 Ueda et al. .................. 361/683
7,110,249 B2 * 9/2006 Nakatani et al. ............ 361/683

FOREIGN PATENT DOCUMENTS

JP 2002-281576 A 9/2002

* cited by examiner

*Primary Examiner*—Hung V Duong
(74) *Attorney, Agent, or Firm*—Lerner, David, Littenberg, Krumholz & Mentlik, LLP (57) ABSTRACT An image display device having an image display panel, the image display device including: as a casing, a base part mountable on a horizontal surface, a rising part rising from the base part in a state of being inclined frontward at a predetermined angle, and a panel retaining part connected to an upper part of the rising part, the panel retaining part retaining the image display panel; and a speaker disposed in an upper surface of the base part with an acoustic output surface of the speaker facing upward, sound output from the speaker being reflected by the rising part.

5 Claims, 8 Drawing Sheets

IMAGE DISPLAY DEVICE

CROSS-REFERENCE TO RELATED APPLICATIONS

The present application claims priority from Japanese Patent Application No. JP 2006-352609, filed in the Japanese Patent Office on Dec. 27, 2006, the entire content of which is incorporated herein by reference.

BACKGROUND OF THE INVENTION

1. Field of the Invention

The present invention relates to an image display device suitable for application to a television receiver, a display for a computer, and the like.

2. Description of the Related Art

There have been various forms of casings forming a television receiver in the past. Various television receivers using a thin display panel such as a liquid crystal display panel or the like, in particular, have recently spread, which receivers have a smaller thickness than television receivers using existing cathode-ray tubes.

Figure 8:
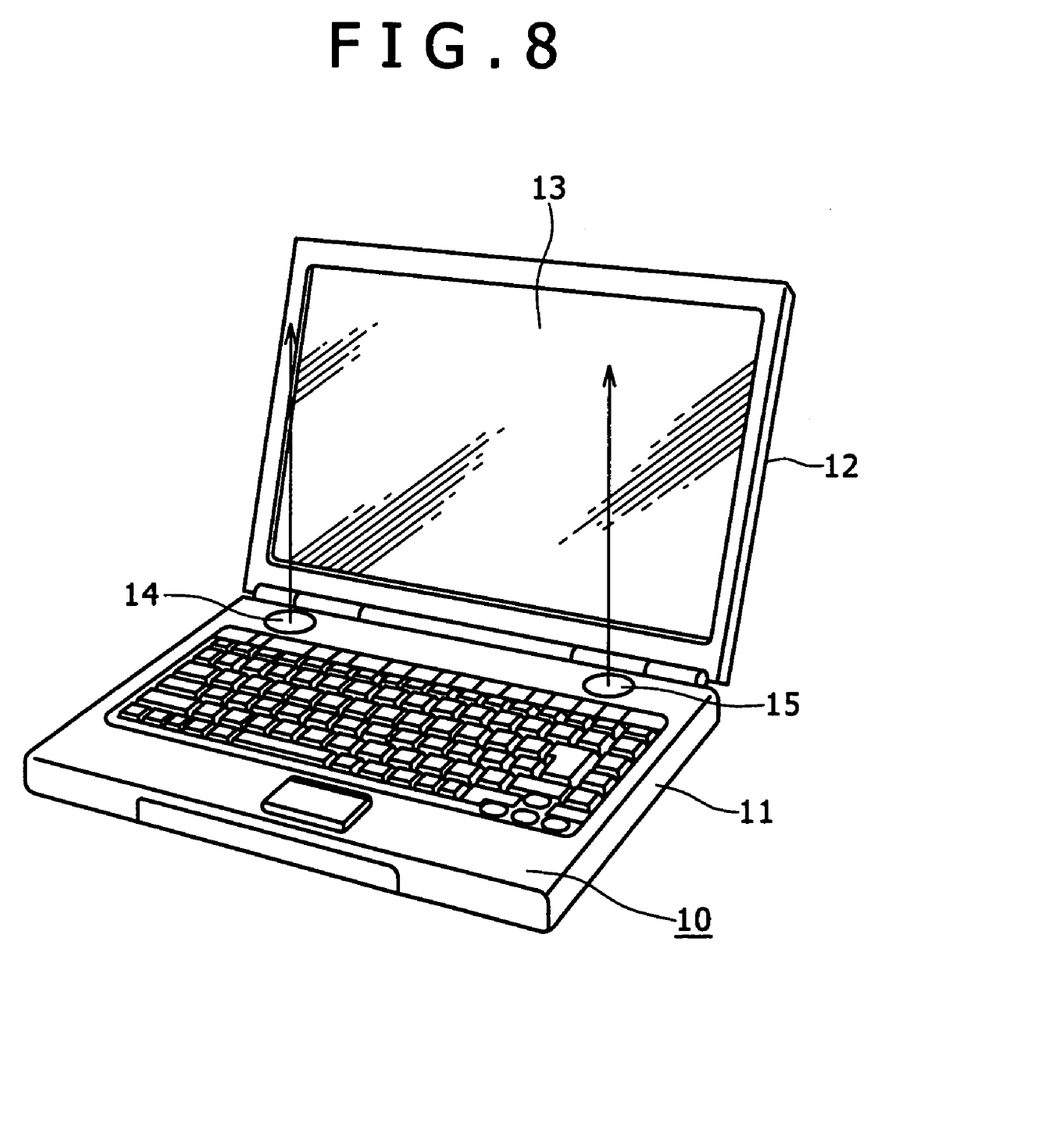
FIG. 8 is a perspective view showing an example of configuration of an existing image display device.

FIG. 8 is a diagram showing an example of a display device using an existing liquid crystal display panel.

The display device of FIG. 8 is an example of a laptop personal computer device. The personal computer device 10 has a first casing 11 and a second casing 12 connected to each other in such a manner as to be able to be opened or closed freely. A keyboard and the like are arranged on the first casing 11 side. A liquid crystal display panel 13 is disposed on the second casing 12 side. In addition, two speakers 15 are disposed in an upper part of the first casing 11.

The speakers 15 are disposed on the first casing 11 side as shown in FIG. 8 because the first casing 11 has more installation space to spare than the second casing 12 in which the display panel 13 is disposed. The second casing 12 is not suitable for the disposition of speakers because of a relatively small thickness of the second casing 12, and the relatively large display panel disposed in the second casing 12 also makes it difficult to install speakers in the second casing 12.

Japanese Patent Laid-Open No. 2002-281576 (FIG. 4) discloses an example of a display device having this kind of configuration.

SUMMARY OF THE INVENTION

However, when speakers are disposed facing upward in this kind of display device as shown in FIG. 8, sound output from the speakers goes upward as indicated by arrows in FIG. 8. Therefore the sound does not go directly to the side of a user viewing an image displayed on the display panel 13, thus resulting in a problem of poor sound quality. The emission of the sound in a direction different from a direction in which the user faces as shown in FIG. 8 is not desirable especially because speaker units mounted in this kind of display device are small speaker units.

The present invention has been made in view of the above. It is desirable to provide a novel constitution in which speakers are mounted in this kind of display device in a favorable manner.

The present invention is formed as an image display device having an image display panel. The image display device includes, as a casing, a base part mountable on a horizontal surface, a rising part rising from the base part in a state of being inclined frontward at a predetermined angle, and a panel retaining part connected to an upper part of the rising part, the panel retaining part retaining the image display panel. A speaker is disposed in an upper surface of the base part of the casing with an acoustic output surface of the speaker facing upward, sound output from the speaker being reflected by the rising part.

With this constitution, sound output from the speaker disposed in the base part of the casing is reflected by the inclined rising part located under the display panel, and then emitted to a front side. Thus the sound is output frontward. Hence, the sound is emitted from the image display panel side to a user situated at a position to view an image displayed on the image display panel from the front, so that a desirable acoustic output state is obtained.

According to an embodiment of the present invention, even though the speaker is disposed on the base part, sound is emitted from the image display panel side. Hence, even with the constitution in which the speaker is disposed in the base part having a relatively large installation space to spare and in which the speaker is not disposed in the display panel retaining part and the rising part under the panel retaining part, excellent acoustic characteristics can be obtained, and the casing can be favorably formed as a thin casing for making the most of the small thickness of the image display panel.

DETAILED DESCRIPTION OF THE PREFERRED EMBODIMENT

An embodiment of the present invention will hereinafter be described with reference to FIGS. 1 to 7.

Figure 1:
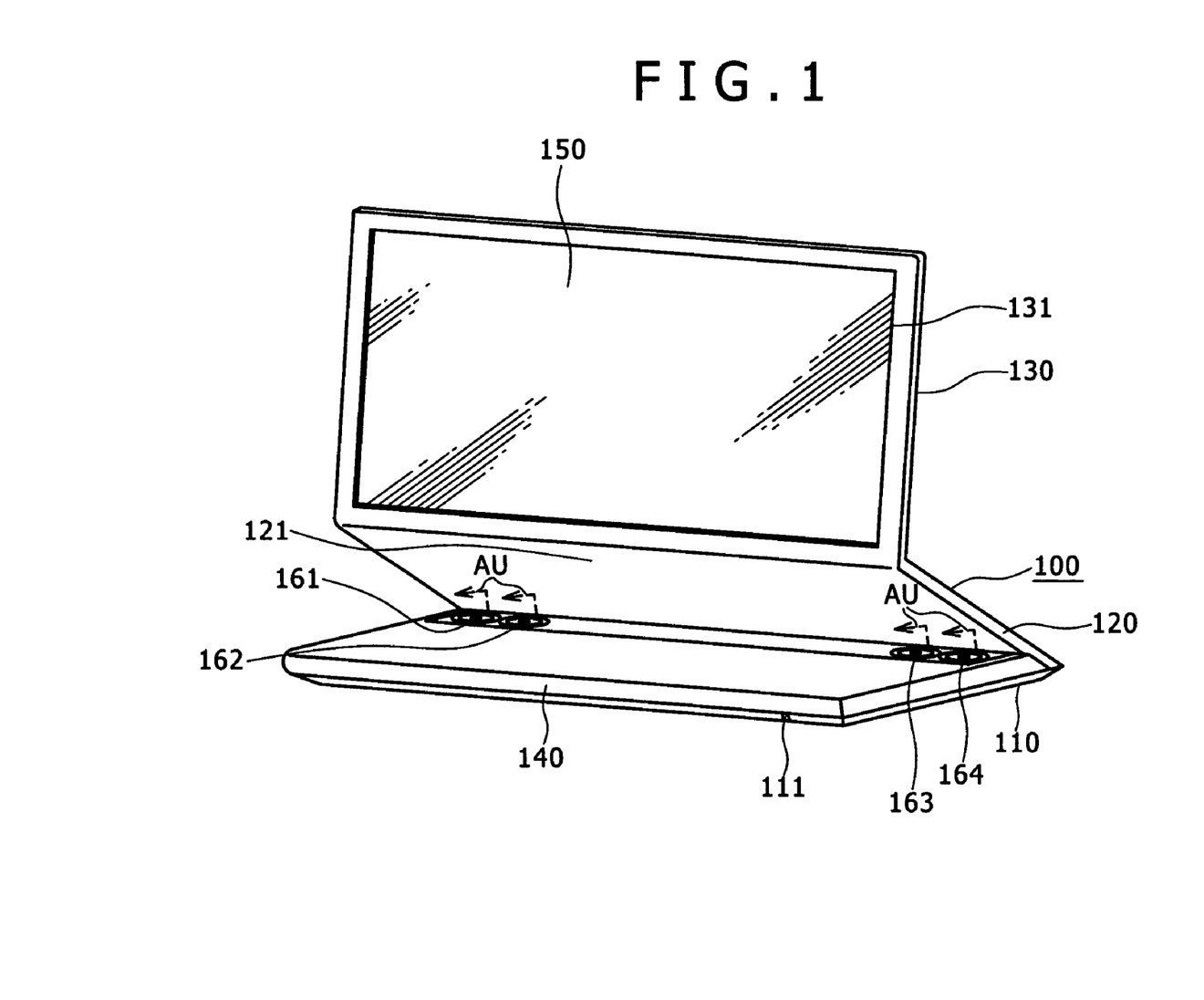
FIG. 1 is a perspective view showing an example of a device according to one embodiment of the present invention from a front side.
Figure 2:
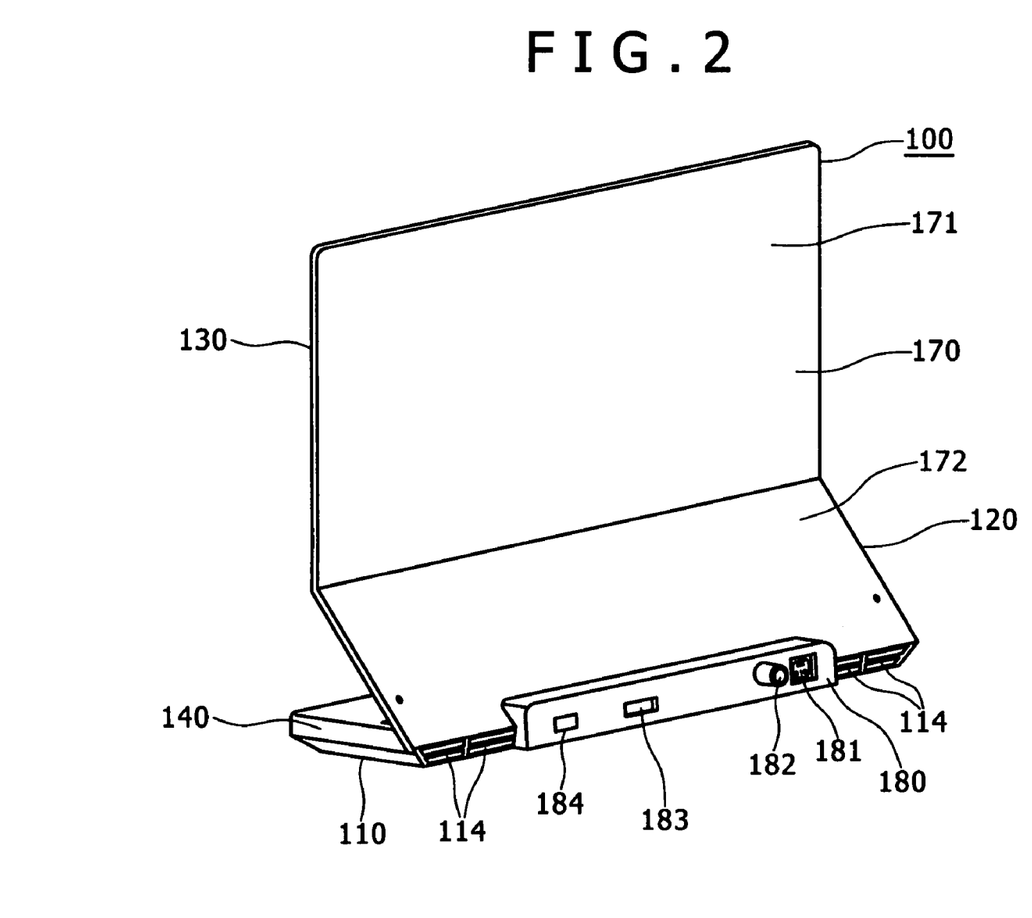
FIG. 2 is a perspective view showing an example of a device according to one embodiment of the present invention from a back side.
Figure 3:
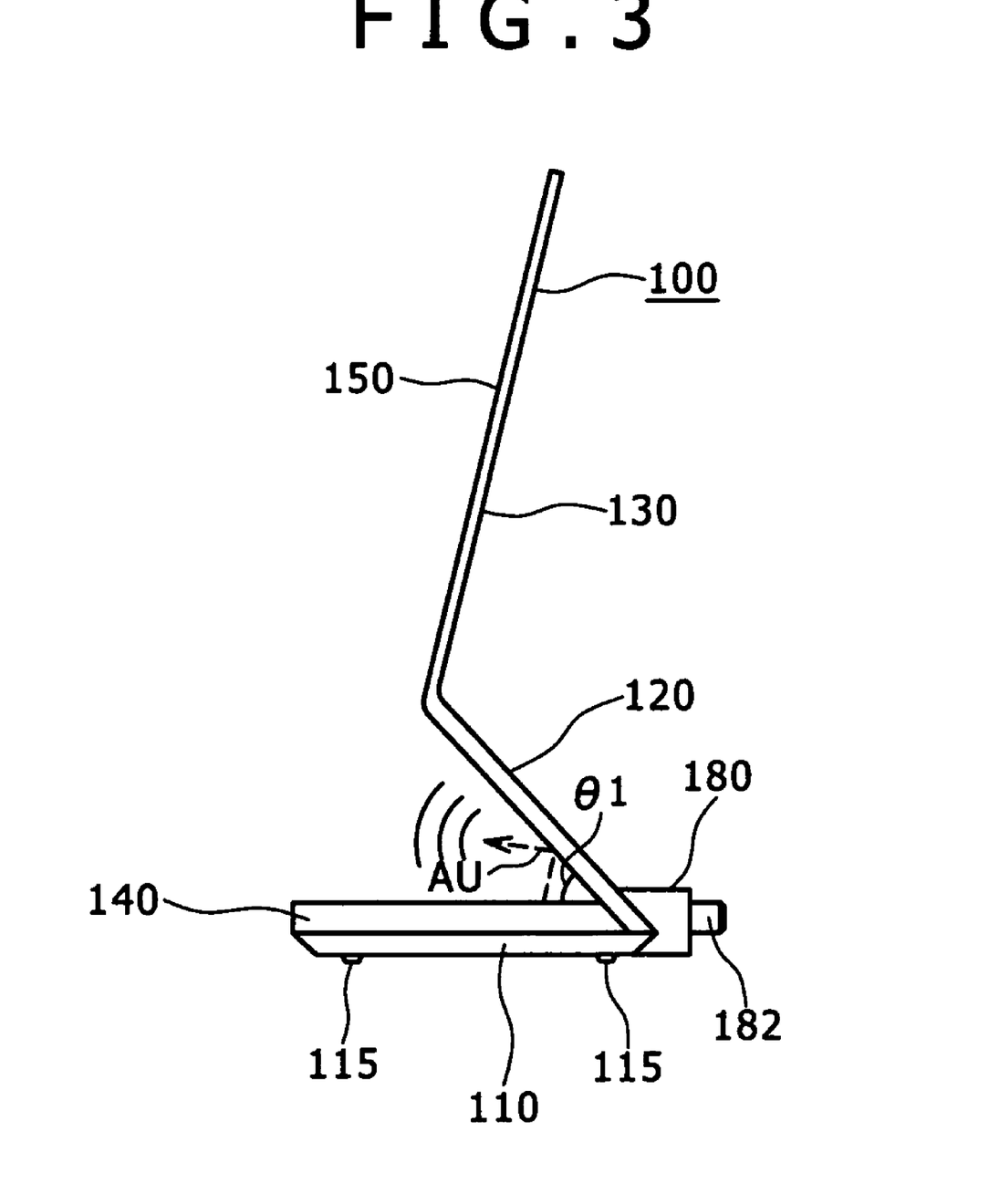
FIG. 3 is a side view showing an example of a device according to one embodiment of the present invention.

FIG. 1 is a perspective view of a television receiver 100 according to the present embodiment as viewed from a front side. FIG. 2 is a perspective view of the television receiver 100 as viewed from a back side. FIG. 3 is a side view of the television receiver 100.

As shown in FIG. 1, the television receiver 100 includes as a casing for forming the main body of the receiver: a base part 110; a rising part 120 rising from the rear of the base part 110 at a predetermined angle; and a panel retaining part 130 connected to the upper edge of the rising part 120. The panel retaining part 130 has a frame part 131. The image display area of a display panel 150 is disposed in the frame part 131. In the present embodiment, an organic EL (electro-luminescence) panel is used for the image display panel 150. The organic EL panel is a panel in which light emitting bodies formed by an organic material are arranged in the form of a matrix for image display. Because the light emitting bodies formed on the panel emit light, the organic EL panel does not demand a backlight. In the present embodiment, the length of a diagonal line of the screen is about 13 inches as screen size.

The base part 110 and the rising part 120 have a width equal to the breadth of the panel retaining part 130. An angle θ1 (FIG. 3) formed by the base part 110 and the rising part 120 is about 45 degrees. As shown in FIG. 3, the panel retaining part 130 connected to the upper part of the rising part 120 is slightly inclined to the rear rather than being upright. The base part 110, the rising part 120, and the panel retaining part 130 are each formed by a metallic plate such as a stainless plate and an aluminum plate.

The base part 110 is formed on a flat plate so as to be able to be placed on a horizontal surface such as the top of a table or the like. As shown in FIG. 1, a base part cover 140 is disposed as the upper surface of the base part 110. The base part cover 140 is also formed by a metal. Four speaker units 161, 162, 163, and 164 are disposed in the rear of the upper surface of the base part 110. The speaker units are arranged at positions in the upper surface of the base part 110 in the vicinity of a part where the base part 110 and the rising part 120 are connected to each other. The speaker units 161, 162, 163, and 164 are housed in twos in speaker boxes 160L and 160R (FIG. 4), as will be described later. Relatively thin speaker units that all have a same size are used as the speaker units 161, 162, 163, and 164. The speakers are arranged with the acoustic output surfaces of the respective speaker units facing upward, and the sound (audio) output surfaces are arranged horizontally in a lateral row in the rear of the base part cover 140 as the upper surface of the base part 110.

With the speaker units 161, 162, 163, and 164 thus arranged, as indicated by dashed arrows in FIG. 1 and FIG. 3, sound in an output state AU from the speaker units 161 to 164 goes up vertically in straight lines from the speaker units 161 to 164, hits the inner wall 121 of the inclined rising part 120, and then bends frontward. Thus, the sound from the speaker units 161 to 164 goes to the side of a user viewing display of the display panel 150 in a direction substantially opposite to a line of sight of the user viewing the display panel 150.

An infrared light receiving window 111 is disposed at a front edge of the base part 110. A light receiving element 113 (FIG. 6) for receiving the light of a remote control signal (infrared signal) from a remote control device is disposed on the inside of the infrared light receiving window 111.

As shown in FIG. 2, which shows the back side of the television receiver 100 according to the present embodiment, the television receiver 100 has a back cover 170 attached to the back of the rising part 120 and the panel retaining part 130. A cover part 171 of the panel retaining part 130 and a cover part 172 of the rising part 120 are formed integrally with each other as the back cover 170. The back cover 170 is also made of a metal.

As shown in FIG. 2, a terminal cover 180 is attached to the center of the rear end of the base part 110. Each terminal necessary for the television receiver 100 is attached to a position where the terminal cover 180 is disposed. That is, a power supply input terminal 181, an F terminal 182, an HDMI terminal 183, and a LAN terminal 184 are disposed. However, these terminals 181 to 184 are attached to a board side to be described later, and the terminal cover 180 only covers the periphery of electronic parts forming each terminal. Ventilation holes 114 are provided on the left side and the right side of the rear end of the base part 110, so that a heat dissipating process can be performed by the action of a fan to be described later.

A state in which each member is disposed within the casing for forming the television receiver 100 will next be described with reference to FIG. 4 and subsequent figures.

Figure 4:
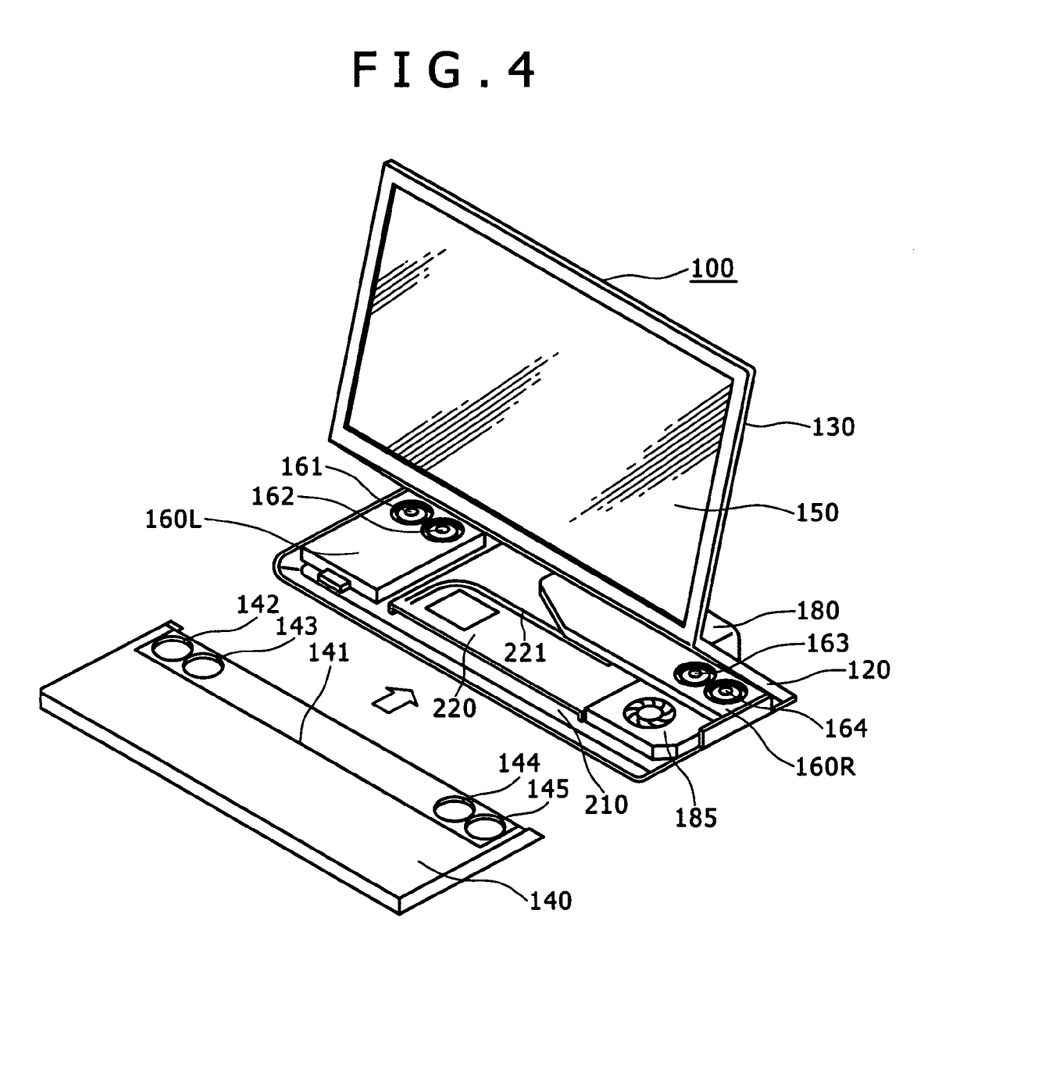
FIG. 4 is a perspective view showing an example of a device according to one embodiment of the present invention in a partially disassembled state from the front side.

FIG. 4 is a diagram showing the inside of the base part 110 with the base part cover 140 removed from the base part 110. As shown in FIG. 4, a circuit board 210 is disposed at the center of the base part 110, and a shield plate 220 is disposed on the circuit board 210. The circuit board 210 is disposed substantially horizontally within the base part 110. A heat pipe 221 for cooling is attached to the shield plate 220 in the present example. Speaker boxes 160L and 160R are arranged on the left and the right of the base part 110. The speaker box 160L of the speaker boxes 160L and 160R has two speaker units 161 and 162 mounted therein to reproduce audio of a left channel. The speaker box 160R has two speaker units 163 and 164 mounted therein to reproduce audio of a right channel. The four speaker units 161 to 164 used in this case all have a same size and same characteristics.

As shown in FIG. 4, a fan 185 is disposed in front of the right-channel speaker box 160R. The two speaker boxes 160L and 160R have different shapes in order to avoid a position in which the fan 185 is disposed. However, although the two speaker boxes 160L and 160R have different shapes, the volumes of the two speaker boxes 160L and 160R are substantially the same, so that acoustic characteristics of the left channel are equal to acoustic characteristics of the right channel. Through holes 142, 143, 144, and 145 are provided in the base part cover 140 in such a manner as to correspond to the positions where the respective speaker units 161 to 164 are disposed. The through holes 142 to 145 for the speakers are provided in a depression part 141 in the rear of the base part cover 140.

The fan 185 cools circuit parts on the circuit board 210 which circuit parts generate heat by operating. The fan 185 performs a cooling process using the ventilation holes 114 shown in FIG. 2. At this time, one end of the heat pipe 221 is disposed in the vicinity of a part where ventilation for cooling is provided, so that a cooling effect of the circuit board 210 is enhanced. The ventilation holes 114 shown in FIG. 2 are provided to the right and to the left of the rear end of the base part 110. One of the ventilation holes 114 is used as an intake for a cooling air, and the other ventilation hole 114 is used as an outlet for the cooling air. Thus, a flow of air is produced by the fan 185 so as to pass the positions where the circuit board 210 and the shield plate 220 are disposed.

Figure 5:
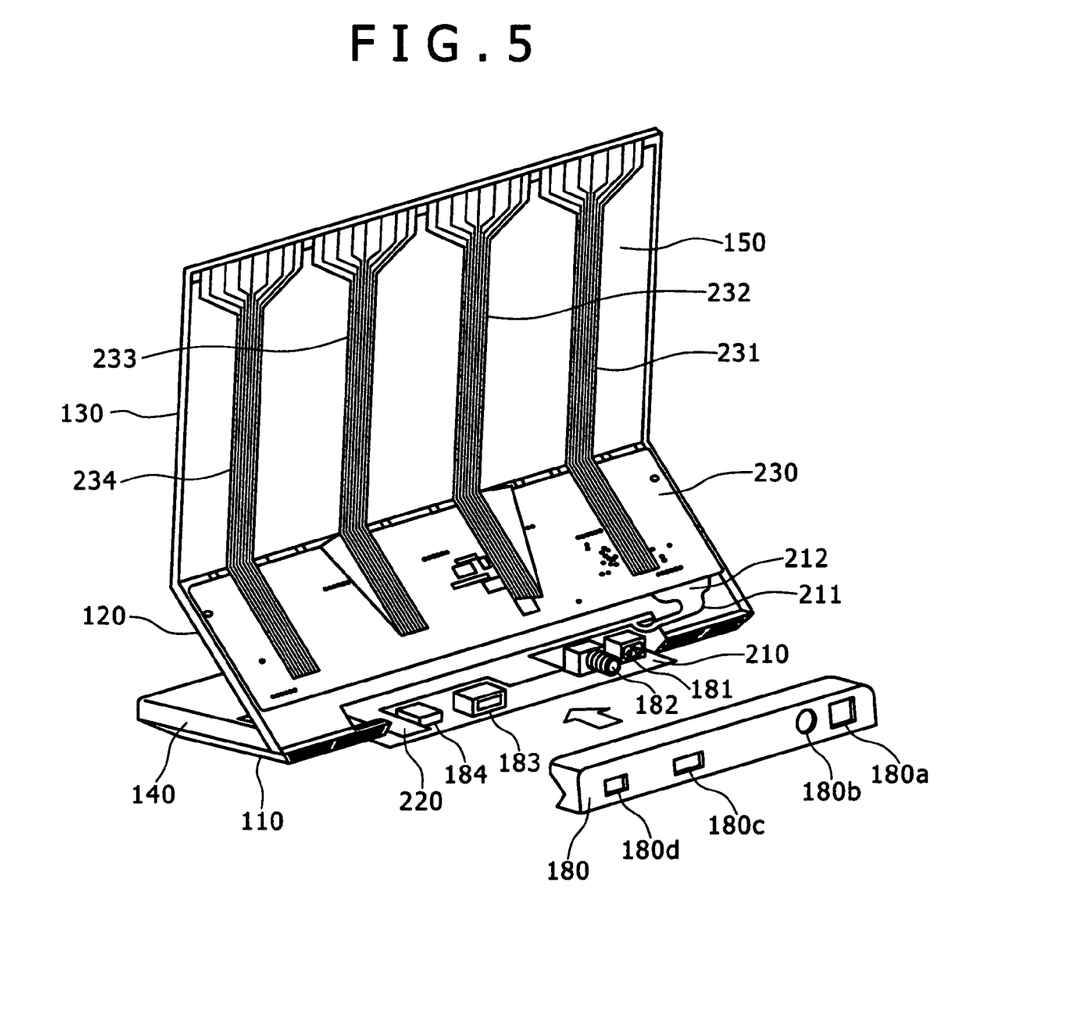
FIG. 5 is a perspective view showing an example of a device according to one embodiment of the present invention in a partially disassembled state from the back side.

FIG. 5 shows a state in which the back cover 170 and the terminal cover 180 are removed from the rear of the television receiver 100 shown in FIG. 2. The circuit board 210 is disposed in a central part of the rear of the base part 110 in a state of being slightly projected. The parts forming the respective terminals (the power supply input terminal 181, the F terminal 182, the HDMI terminal 183, and the LAN terminal 184) are mounted on the rear end part of the circuit board 210. Then, as shown in FIG. 5, through holes 180a, 180b, 180c, and 180d corresponding to the disposing positions of the respective terminals are arranged in the terminal cover 180. The terminal cover 180 is connected to the casing, whereby each terminal is in a disposed state as shown in FIG. 2.

An example of a circuit formed on the circuit board 210 on which these terminals are arranged will be described later with reference to FIG. 7. However, the circuit on the circuit board 210 basically performs reception processing for an input broadcast signal, subjects an image signal obtained by the reception processing or an externally input image signal (video signal) to processing for display, and also performs audio signal processing. The image signal for display after being processed by the circuit board 210 is supplied to a driving circuit board 230 disposed in the rising part 120. In order to supply the image signal to the driving circuit board 230, a connector 212 at an end of a signal line 211 extracted from the circuit board 210 is connected to a terminal part (not shown) on a lower end side of the driving circuit board 230.

As shown in FIG. 5, the driving circuit board 230 is of such a size as to cover substantially an entire surface within the rising part 120. A circuit formed on the driving circuit board 230 generates a driving signal for driving each pixel within the display panel 150. The driving circuit board 230 is formed as a circuit board having a breadth substantially equal to the breadth of the display panel 150. The driving signal generated within the driving circuit board 230 is sent to the display panel 150 using a plurality of flexible boards 231, 232, 233, and 234. In the present example, the driving signal is sent to a lateral row at an upper end of the display panel 150, and upper ends of the four flexible boards 231 to 234 are connected to most of the upper end of the display panel 150.

Figure 6:
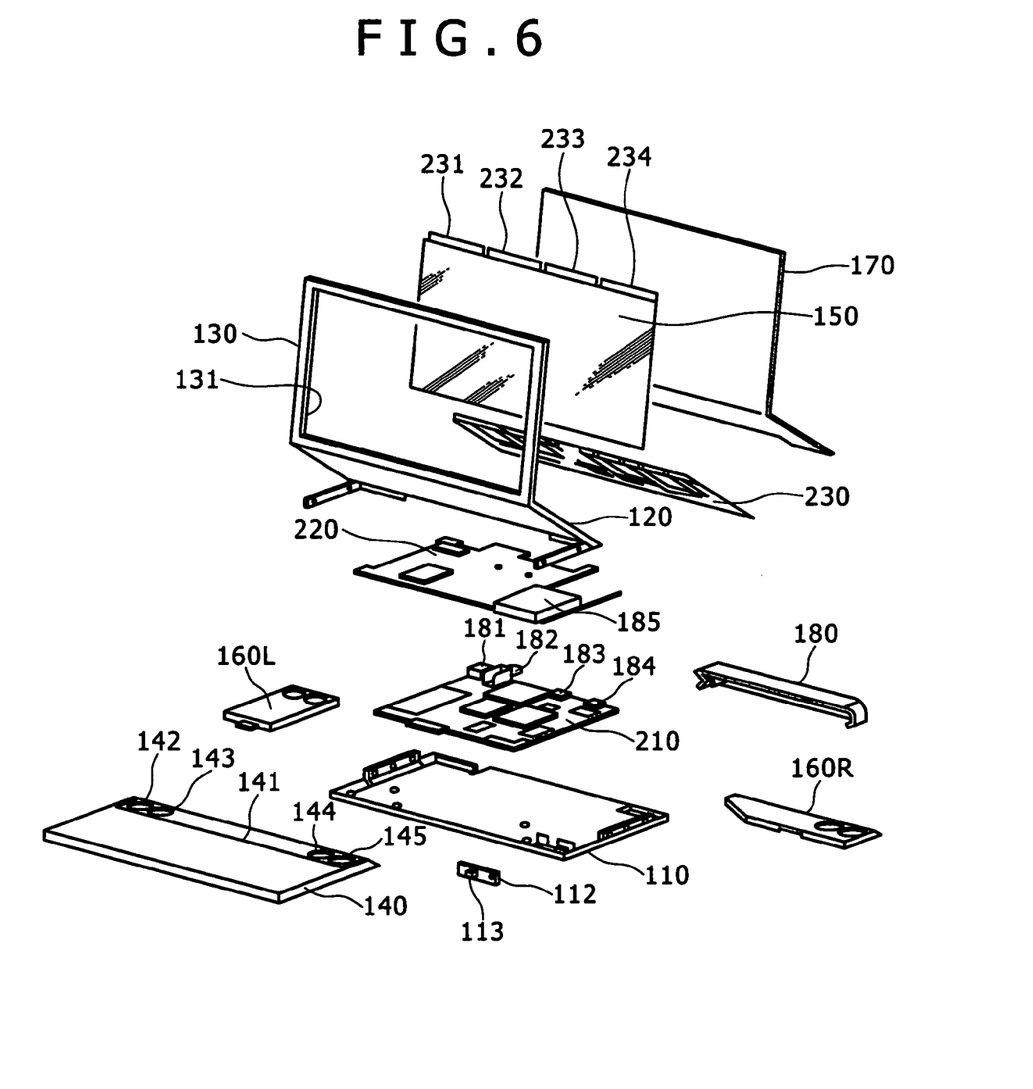
FIG. 6 is an exploded perspective view showing an example of a device according to one embodiment of the present invention in a disassembled state.

FIG. 6 is a diagram showing the parts described thus far in a disassembled state. The upper end of the surface of the display panel 150, which is configured as an organic EL panel by forming light emitting elements on a glass substrate, is connected from a back side to the end parts of the four flexible boards 231 to 234. The driving signal is supplied from the driving circuit board 230 side to the display panel 150.

Incidentally, a light emitting element 113 attached to a small board 112 is mounted on the back side of the infrared light receiving window 111 (FIG. 1) within the base part 110. A light guiding member formed by a transparent resin member or the like is disposed between the light emitting element 113 and the infrared light receiving window 111, so that light incident from the infrared light receiving window 111 enters the light emitting element 113 effectively.

This light emitting element 113 is electrically connected to the circuit board 210. A controlling unit 212 to be described later determines the code of a received remote control signal, and then performs predetermined control.

Figure 7:
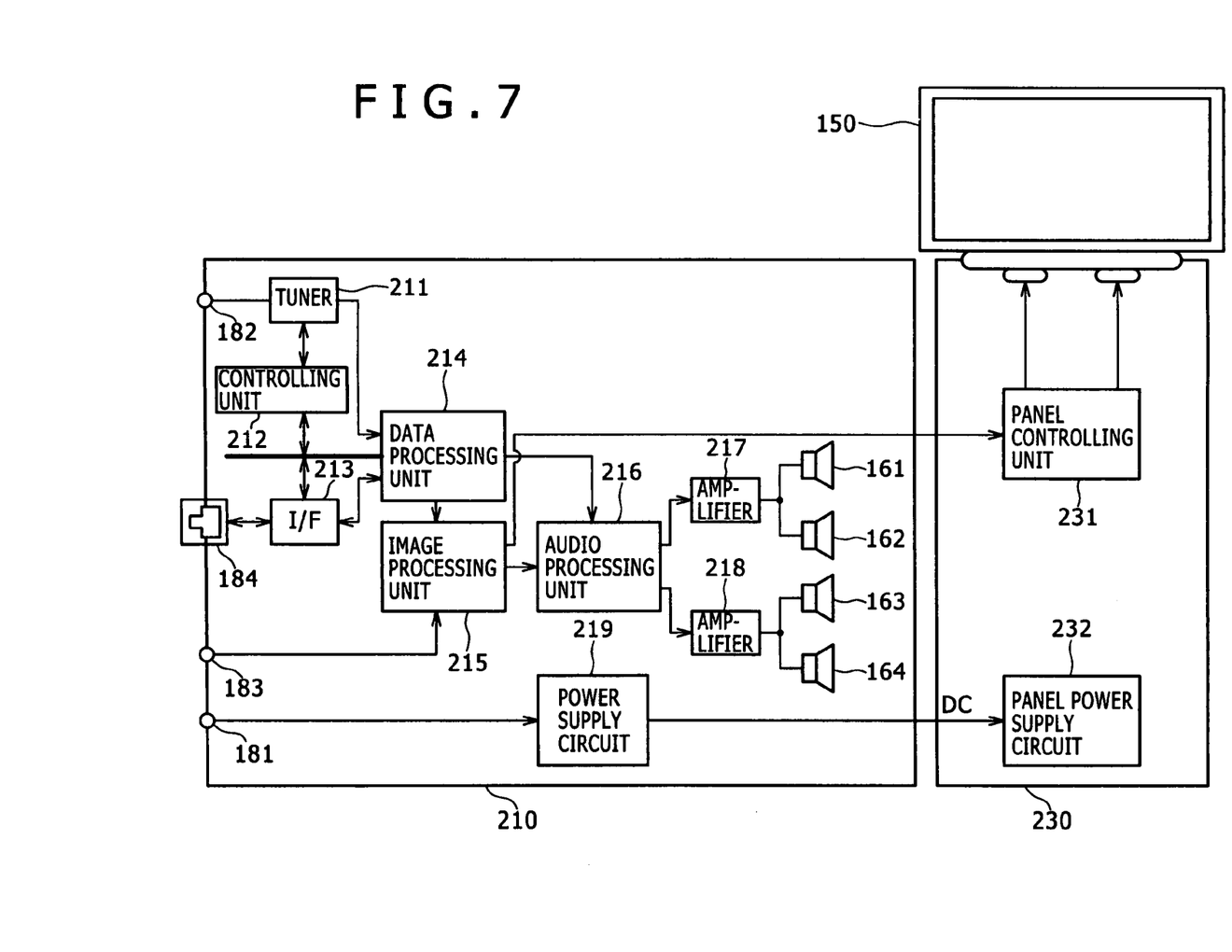
FIG. 7 is a block diagram showing an example of a device according to one embodiment of the present invention.

FIG. 7 is a diagram showing an example of configuration of a circuit formed on the circuit board 210 and the driving circuit board 230 in the present example. The circuit configuration will be described below. The F terminal 182 connected with an antenna wire or the like is connected to a tuner 211. The tuner 211 receives a broadcast signal obtained by the F terminal 182. A received channel is set by control of the controlling unit 212. The image signal received and obtained by the tuner 211 is sent to a data processing unit 214 to be subjected to various data processing, and then sent to an image processing unit 215. A signal received by the network terminal 184 is sent to an interface unit 213. A received control signal is sent to the controlling unit 212, whereas a received image signal is sent to the data processing unit 214 and thereafter sent to the image processing unit 215.

The image processing unit 215 performs various image processing necessary for making display. An image signal resulting from image processing in the image processing unit 215 is sent to the driving circuit board 230. A panel controlling unit 231 within the driving circuit board 230 generates a signal for driving each pixel of the display panel 150. The driving signal is sent to the display panel 150.

An image signal obtained by the HDMI terminal 183 is directly sent to the image processing unit 215. The image processing unit 215 sends an audio signal superimposed on the image signal to an audio processing unit 216. An audio signal obtained by the data processing unit 214 via the tuner 211 or the like is also sent to the audio processing unit 216. The audio processing unit 216 for example converts such an audio signal into an analog audio signal. An audio signal of the left channel and an audio signal of the right channel are amplified by amplifiers 217 and 218 separately from each other, and then output from the speaker units 161 to 164.

A direct-current power is input to the power supply input terminal 181. A power supply circuit 219 within the circuit board 210 generates a direct-current power having a voltage necessary for each circuit within the circuit board 210, and then supplies the direct-current power to each circuit. Further, the power supply circuit 219 supplies a power to a panel power supply circuit 232 in the driving circuit board 230. The panel power supply circuit 232 supplies the power necessary for the panel controlling unit 231.

The above-described television receiver 100 according to the present embodiment is formed as an excellent device that makes the most of the small thickness of the display panel 150. Specifically, sound output upward from the speaker units 161 to 164 disposed in the base part 110 of the casing is reflected by the front surface 121 of the rising part 120 inclined at an angle of about 45 degrees, and then emitted to the front side. Thus the sound is output frontward. Hence, the sound is emitted from the display panel 150 side to a user situated at a position to view an image displayed on the display panel 150 from the front, so that a desirable acoustic output state is obtained. In addition, the display panel retaining part 130 and the rising part 120 under the panel retaining part 130 do not have any speakers. Thus the panel retaining part 130 and the rising part 120 can be formed as a thin casing for making the most of the small thickness of the image display panel, and also set acoustic characteristics in an excellent state.

In the present embodiment, the two speaker units 161 and 162 are arranged as speakers for the left side channel, and the two speaker units 163 and 164 are arranged as speakers for the right side channel. By thus using a total of four speaker units, even when the volume of the sound output from one speaker unit is limited because of a limitation on the thickness of the base part 110 or the like, it is possible to output a sound at a relatively high volume level. Therefore a limitation on a speaker arrangement and the securing of an output sound volume can be made compatible with each other. In particular, as shown in FIG. 1 and the like, the four speakers are arranged in a lateral direction in a straight line, and therefore the sound reflected by the rising part 120 is spread horizontally in a direction of emission, hence resulting in a desirable acoustic output state.

It is to be noted that while in the embodiment explained thus far, description has been made of an example in which an organic EL panel is used as an image display panel, the television receiver may use other thin panels for image display. For example, the present invention may be applied to displays based on a display principle referred to as electronic paper. Alternatively, a liquid crystal display panel may be used. When a liquid crystal display panel is used, a backlight needs to be incorporated, and it is thus difficult to achieve a reduced thickness as in the example of FIG. 3. However, by forming a similar casing and similarly arranging each circuit board, it is possible to perform efficient operations from the reception and input of signals to the supply of a driving signal to the panel.

In addition, the shape of the casing described in the foregoing embodiment is one example, and is not limited to the formations shown in respective figures. For example, while the rising part 120 has a shape such that the rising part 120 is disposed at a relatively great angle of inclination of about 45 degrees, the rising part 120 may have an upright form at a less angle.

In addition, the circuit configuration shown in FIG. 7 is one example, and is not limited to the configuration of FIG. 7. For example, a part of the circuit incorporated in the circuit board 210 included in the base part 110 may be incorporated into the driving circuit board 230 side included in the rising part 120.

In addition, while the present embodiment is an example of an image display device formed as a television receiver including a tuner, the present invention may be applied to image display devices as a so-called monitor having only a terminal for receiving an image signal (video signal). For example, the image display device may be configured as a display for a computer device.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device having an image display panel, said image display device comprising:

casing having a base part mountable on a horizontal surface, a rising part rising from said base part in a state of being inclined frontward at a predetermined angle, and a panel retaining part connected to an upper part of said rising part, said rising part having an inner wall and said panel retaining part retaining said image display panel; and a speaker disposed in an upper surface of said base part with an acoustic output surface of said speaker facing upward such that during operation sound output from said speaker is reflected by said inner wall of said rising part towards a user situated to view an image displayed on the image display panel.

2. The image display device according to claim 1, wherein said speaker is disposed in the upper surface of said base part in a vicinity of a connecting part where said base part and said rising part are connected to each other.

3. The image display device according to claim 2, wherein said speaker is formed by arranging a plurality of speaker units in a lateral direction in the vicinity of said connecting part.

4. The image display device according to claim 1, wherein the predetermined angle is formed between a top surface of said base part and said inner wall of said rising part and is approximately 45 degrees.

5. The image display device according to claim 1, wherein the predetermined angle is formed between a top surface of said base part and said inner wall of said rising part and is less than 45 degrees.

* * * * *